US011190786B2

(12) United States Patent
Han et al.

(10) Patent No.: US 11,190,786 B2
(45) Date of Patent: Nov. 30, 2021

(54) TRANSCODING ULTRA-HIGH-DEFINITION PANORAMIC VIDEOS

(71) Applicant: AT&T Intellectual Property I, L.P., Atlanta, GA (US)

(72) Inventors: Bo Han, Bridgewater, NJ (US); Zhengye Liu, Pleasanton, CA (US); Shu Shi, Summit, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 15 days.

(21) Appl. No.: 16/581,047

(22) Filed: Sep. 24, 2019

(65) Prior Publication Data

US 2021/0092418 A1 Mar. 25, 2021

(51) Int. Cl.
*H04N 19/40* (2014.01)
*H04N 19/597* (2014.01)
*G06T 3/00* (2006.01)

(52) U.S. Cl.
CPC ........... *H04N 19/40* (2014.11); *G06T 3/0087* (2013.01); *H04N 19/597* (2014.11)

(58) Field of Classification Search
CPC ..... H04N 19/40; H04N 19/597; G06T 3/0087
See application file for complete search history.

(56) References Cited

U.S. PATENT DOCUMENTS

| 10,681,326 | B2 * | 6/2020 | Zhou | H04N 21/21805 |
| 2016/0171743 | A1 | 6/2016 | Urbach | |
| 2016/0217760 | A1 * | 7/2016 | Chu | H04N 13/279 |
| 2018/0160123 | A1 * | 6/2018 | Van Der Auwera | H04N 19/513 |
| 2018/0160160 | A1 * | 6/2018 | Swaminathan | H04N 21/8456 |
| 2018/0249076 | A1 * | 8/2018 | Sheng | H04N 19/184 |
| 2019/0310472 | A1 * | 10/2019 | Schilt | H04N 21/2662 |

(Continued)

FOREIGN PATENT DOCUMENTS

EP 3644619 A1 * 4/2020 ....... H04N 21/21805

OTHER PUBLICATIONS

Feng Qian, et al. "Optimizing 360 Video Delivery Over Cellular Networks," AllThingsCellular16, Oct. 3-7, 2016, New York City, NY, USA. © 2016 ACM. ISBN 978-1-4503-4249-0/16/10. DOI: http://dx.doi.org/10.1145/2980055.2980056.

(Continued)

*Primary Examiner* — Maria E Vazquez Colon

(57) ABSTRACT

In one example, a processing system including at least one processor may obtain viewport information of a mobile computing device associated with a panoramic video, map the viewport information to a plurality of blocks of a frame of the panoramic video in accordance with a cube map projection of the frame, encode the plurality of blocks into a projected frame, and transmit the projected frame to the mobile computing device. In another example, a processing system of a mobile computing device including at least one processor may obtain viewport information of the device associated with a panoramic video, transmit to a server the viewport information, obtain from the server a projected frame of the panoramic video comprising a plurality of blocks of a frame of the panoramic video that are associated with the viewport information in accordance with a cube map projection of the frame, and buffer the projected frame.

20 Claims, 4 Drawing Sheets

(56) References Cited

U.S. PATENT DOCUMENTS

2020/0202619 A1* 6/2020 Sheng .................... G06T 15/04
2021/0092374 A1* 3/2021 Takahashi ............ H04N 13/161

OTHER PUBLICATIONS

Ahmed Hamza, et al. "Adaptive Streaming of Interactive Free Viewpoint Videos to Heterogeneous Clients," MMSys16, May 10-13, 2016, Klagenfurt, Austria. © 2016 ACM. ISBN 978-1-4503-4297-1/16/05. DOI: http://dx.doi.org/10.1145/2910017.2910610.

Tuan Thanh Le, et al., "Efficient Transcoding and Encryption for Live 360 CCTV System," Appl. Sci. 2019, 9, 760; doi:10.3390/app9040760, www.mdpi.com/journal/applsci.

Simone Mangiante, "VR is on the Edge: How to Deliver 360° Videos in Mobile Networks," VR/AR Network '17, Aug. 25, 2017, Los Angeles, CA, USA © 2017 ACM ISBN ISBN 978-1-4503-5055-6/17/08. https://doi.org/10.1145/3097895.3097901.

"Encoding Video at the Edge with Intel® Xeon® Processors," Solution Brief | Encoding Video at the Edge with Intel® Xeon® Processors, Copyright © 2017 Intel Corporation.

Feng Qian, "Flare: Practical Viewport-Adaptive 360-Degree Video Streaming for Mobile Devices," MobiCom'18, Oct. 29-Nov. 2, 2018, New Delhi, India © 2018 Association for Computing Machinery. ACM ISBN 978-1-4503-5903-0/18/10., https://doi.org/10.1145/3241539.3241565.

Kobbelt, Leif & Botsch, Mario. (2004). A Survey of Point-Based Techniques in Computer Graphics. Computer. 28. 801-814. 10.1016/j.cag.2004.08.009.

Kowalski, Marek & Naruniec, Jacek & Daniluk, Michal. (2015). Livescan3D: A Fast and Inexpensive 3D Data Acquisition System for Multiple Kinect v2 Sensors. 318-325. 10.1109/3DV.2015.43.

Adrien Maglo, Guillaume Lavou'e, Florent Dupont, C'eline Hudelot, 2013. 3D mesh compression: survey, comparisons and emerging trends. ACM Comput. Surv. 9, 4, Article 39 (Sep. 2013), 40 pages.

Ruwen Schnabel and Reinhard Klein, In proceedings of Symposium on Point-Based Graphics 2006, Eurographics, Jul. 2006, Presented at Symposium on Point-Based Graphics, 2006.

\* cited by examiner

TRANSCODING ULTRA-HIGH-DEFINITION PANORAMIC VIDEOS

The present disclosure relates generally to panoramic video streaming, and more particularly to methods, non-transitory computer-readable media, and apparatuses for mapping viewport information to a plurality of blocks of a frame of a panoramic video in accordance with a cube map projection of the frame and encoding the plurality of blocks into a projected frame, and to methods, non-transitory computer-readable media, and apparatuses for obtaining from a server a projected frame comprising a plurality of blocks of a frame of a panoramic video that are associated with viewport information in accordance with a cube map projection of the frame.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
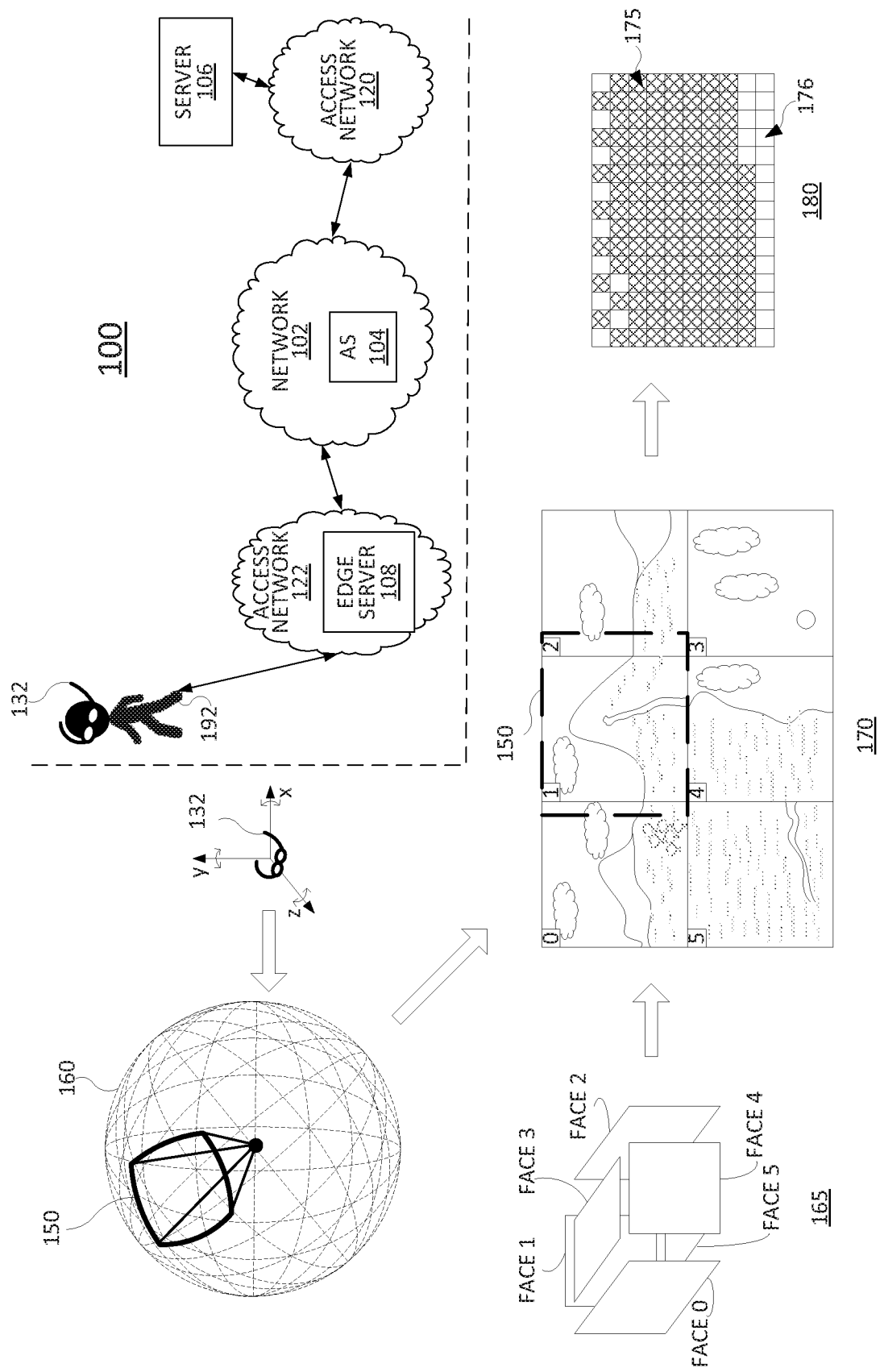
FIG. 1 illustrates an example network related to the present disclosure.

In one example, the present disclosure describes an apparatus, computer-readable medium, and method for mapping viewport information to a plurality of blocks of a frame of a panoramic video in accordance with a cube map projection of the frame and encoding the plurality of blocks into a projected frame. For instance, a processing system including at least one processor may obtain viewport information of a mobile computing device associated with a panoramic video, map the viewport information to a plurality of blocks of a frame of the panoramic video in accordance with a cube map projection of the frame, encode the plurality of blocks into a projected frame, and transmit the projected frame to the mobile computing device.

In another example, the present disclosure describes an apparatus, computer-readable medium, and method for obtaining from a server a projected frame comprising a plurality of blocks of a frame of a panoramic video that are associated with viewport information in accordance with a cube map projection of the frame. For instance, a processing system of a mobile computing device including at least one processor may obtain viewport information of the mobile computing device associated with a panoramic video, transmit to a server the viewport information of the mobile computing device, obtain from the server a projected frame of the panoramic video, the projected frame comprising a plurality of blocks of a frame of the panoramic video that are associated with the viewport information in accordance with a cube map projection of the frame, and buffer the projected frame at the mobile computing device.

Examples of the present disclosure provide a viewport-guided transcoding scheme for streaming ultra-high-definition (UHD) panoramic videos (e.g., 360-degree videos). In order to achieve a high quality of user experience, the displayed content in a user's viewport may be 8K, which may be associated with a raw panoramic video with 16K resolution. However, existing streaming solutions fail to deliver 16K panoramic videos, which may require not only high throughput networks, but also mobile devices with strong video decoding capabilities. In order to improve the network efficiency of video streaming and the quality of experience (QoE) for mobile users, the present disclosure decodes a raw 16K panoramic video into frames, segments each frame into blocks, moves blocks overlapping with a viewport into a 8K video frame, encodes the generated 8K frame into a video stream, and delivers the transcoded 8K stream to a mobile device for rendering and display. The present disclosure can alleviate congestion in cellular core networks, optimize cellular data usage of mobile users, reduce stall time of video playback, and decrease energy consumption on mobile devices.

In a 360-degree video system, a user wearing a display headset can freely change the viewing direction. Technically, the user is situated in the center of a virtual sphere, and the panoramic contents may be downloaded from video servers and projected onto the sphere (e.g., using equirectangular projection). The user's viewport (visible area) is determined by the viewing direction (in latitude/longitude) and the field-of-view (FoV) of the headset, e.g., in real time or near-real time. The FoV defines the extent of the observable area, which may be a fixed parameter of the headset.

Maintaining QoE for 360-degree videos over bandwidth-limited links on commodity mobile devices remains challenging. First, 360-degree videos are large: under the same perceived quality, 360-degree videos have around 5× larger sizes than conventional videos. Second, 360-degree videos are complex: sophisticated projection and content representation schemes may incur high computational overhead. Third, 360-degree videos are still under-explored: there is a lack of real-world experimental studies of key aspects such as rate adaptation, QoE metrics, and cross-layer interactions (e.g., with Transmission Control Protocol (TCP) and web protocols such as Hypertext Transfer Protocol (HTTP)/2).

It has been determined that a human with 20/20 vision (e.g., normal vision) can perceive up to 60 pixels per degree, or 3,600 pixels within an area of 1 degree×1 degree. Current low-end to mid-end virtual reality (VR) headsets may have viewports of about 100 degrees horizontally and 90 degrees vertically. To achieve the resolution of 3,600 pixels/deg$^2$, 32M (3600×100×90) pixels are expected to be in the FoV. However, an 8K video itself has only 8K×4K=32M pixels for the whole panoramic view, falling short of the pristine resolution of 3,600 pixels/deg$^2$. Instead, 16K videos offer 4 times the pixel density compared to that of 8K, making the perceived resolution within the FoV close to the goal of approximately 3,600 pixels/deg$^2$.

One approach to 360-degree video streaming is monolithic streaming. Monolithic streaming delivers uniformly encoded panoramic views and is widely used by many commercial 360-degree video content providers. For more advanced schemes that perform viewport adaptation, a 360-degree video has multiple versions, each having a different scene region, called a quality emphasized region (QER), with a higher encoding rate. A player picks the right version based on the viewer's head orientation. One practical issue of this scheme is that it incurs significant processing and storage overhead at the server side, because a single video may be encoded into close to 100 different versions, each having a different QER.

Using the monolithic approach, e.g., as currently offered by commercial content providers (fetching the entire raw content and decoding it locally at the client device), it has been determined that no high-end smartphone or mainstream laptop is capable of timely decoding 16K H.264 or H.265 (MPEG-4 (Moving Picture Experts Group-4), H.264/AVC (Advanced Video Coding) and H.265/HEVC (High Efficiency Video Coding)) streams with the on-device hardware decoders (software decoders are at least one order of magnitude slower). The reason is that 16K streams have a resolution of 128M pixels per frame (16K×8K), which is beyond the supported resolution of current hardware decoders. Even high-end graphics processing units (GPUs) may be insufficient to timely decode 16K videos. In other words, all of these devices and components may be incapable of maintaining the rendering of the frames of the stream without stalling, dropping or skipping frames, etc.

Another approach to 360-degree video streaming is viewport-adaptive tile-based streaming in which a 360-degree video is spatially (and temporally) segmented into tiles, and only tiles overlapping with predicted FoVs are delivered. To increase the robustness, a player can also fetch the remaining tiles at lower quality, or qualities. In this scheme, each 360-degree video chunk is pre-segmented into multiple smaller units, which are called tiles. One way to generate the tiles is to evenly divide a chunk containing projected raw frames into m×n rectangles each corresponding to a tile. Suppose the projected visible area is $\ominus$. The client may then request the tiles from the available m×n rectangles that overlap with $\ominus$. A tile has the same duration and number of frames as the chunk to which it belongs, but occupies a smaller spatial portion. Each tile can be independently downloaded and decoded. Note that due to projection, despite the viewer's FoV being fixed, the size of $\ominus$ and thus the number of requested tiles may vary. Compared to FoV-agnostic approaches, tiling offers significant bandwidth saving. However, this solution may require mobile devices to simultaneously decode multiple tiles. For mobile devices with limited compute resources, it may result in video stall or skipped video frames, which affect the QoE.

In accordance with the present disclosure, instead of delivering a panoramic (e.g., 360-degree) 16K video directly to a mobile computing device, a network-based processing system (e.g., a server, a group of servers and/or compute resources, etc.) may transcode the panoramic video (e.g., in real-time) into an 8K stream that covers a user's predicted viewport. The (single) 8K stream can thus be efficiently decoded and rendered by a commodity mobile computing device. In one example, this transcoding can be supported by cellular network operators at the network edge. In addition, in one example, the present disclosure may also apply to transcoding an 8K panoramic video into a 4K one that covers a user's predicted viewport, which may be useful for users with mid-end or low-end mobile computing devices.

For a projection scheme such as equirectangular projection, the viewport size on a raw frame, which may be referred to as a raw viewport area (RVA), can vary significantly depending on the viewer's orientation. For instance, when a viewer looks at the equator, the RVA may be small. However, when the viewer looks towards the north pole, the RVA may expand to more than ¼ of the entire raw frame, making the 16K-to-8K transcoding infeasible. This is similar to the distortion exhibited at the high-latitude regions in a world map, which is typically produced using equirectangular projection. In contrast, the RVA of a cube map projection has a much smaller variation (thus yielding lower distortion). In addition, the viewport area is generally less than ¼ of the raw frame regardless of the viewer's orientation (e.g., with a typical FoV of around 100 degrees×90 degrees (or less in either or both dimensions)). Compared to equirectangular projection, cube map projection is also computationally efficient. Examples of the present disclosure therefore use cube map projection for organizing the 360-degree video frames.

The present disclosure also efficiently "reorganizes" the viewport into an 8K×4K rectangular frame. To illustrate, the viewport determined by most projection schemes may have an irregular shape, and its bounding box may exceed 8K×4K pixels. In one example, the present disclosure first divides the raw frame (more specifically, each face of a cube map projection) into small blocks. A block is similar to a tile; however, tiles are independently decodable video streams, while blocks are "atomic" regions with positions that can be rearranged within a single video frame. Therefore, blocks can be made much denser compared to tiles. As such, viewport-adaptive transcoding at the block level in accordance with the present disclosure may omit or reduce the to-be-delivered content that falls outside the viewport (since such content will not be perceived by the viewer).

In one example, the present disclosure may divide the whole frame (e.g., the cube map projection) into 600 blocks (10×10=100 blocks for each face). Based on its position in the cube map projection, each block may be assigned a unique identifier (ID). Under a 100 degree×90 degree FoV, it has been determined that at most 142 blocks are visible in the viewport. This is fewer than the capacity of 150 blocks that an 8K video frame can carry (e.g., a rectangle of 15 blocks horizontally and 10 blocks vertically). For instance, each block may have 533×400 pixels. Horizontally, 15 blocks may then comprise 8K pixels (533×15=7995 pixels, which is approximately 8K), while vertically, 10 bocks may comprise 4K pixels (400×10=4K pixels).

In order to quickly identify the blocks to be included in the viewport, in one example, the present disclosure may first compute and maintain a "visibility map," which may contain mappings of viewer orientation (e.g., expressed as latitude/longitude) to the set of blocks overlapping with the corresponding viewport. For instance, in one example, the visibility map may have 181×361 entries that enumerate all possible orientations (latitude in [−90 degrees, 90 degrees], longitude in [−180 degrees, 180 degrees]) at the granularity of 1 degree, with each entry containing up to 142 block IDs. In another example, the viewer orientation may be expressed in different terms, such as yaw/pitch, yaw/pitch/roll, etc., which may have a similar visibility map to associate viewports with block IDs.

The present disclosure may therefore obtain viewport information of a mobile computing device (e.g., a predicted viewport for an upcoming frame, or information from which the predicted viewport may be calculated), may identify blocks corresponding to the predicted viewport, may organize those blocks into a projected frame, may encode the projected frame (e.g., via at least an intraframe encoding), and may transmit the projected frame to the mobile computing device. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other access networks may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
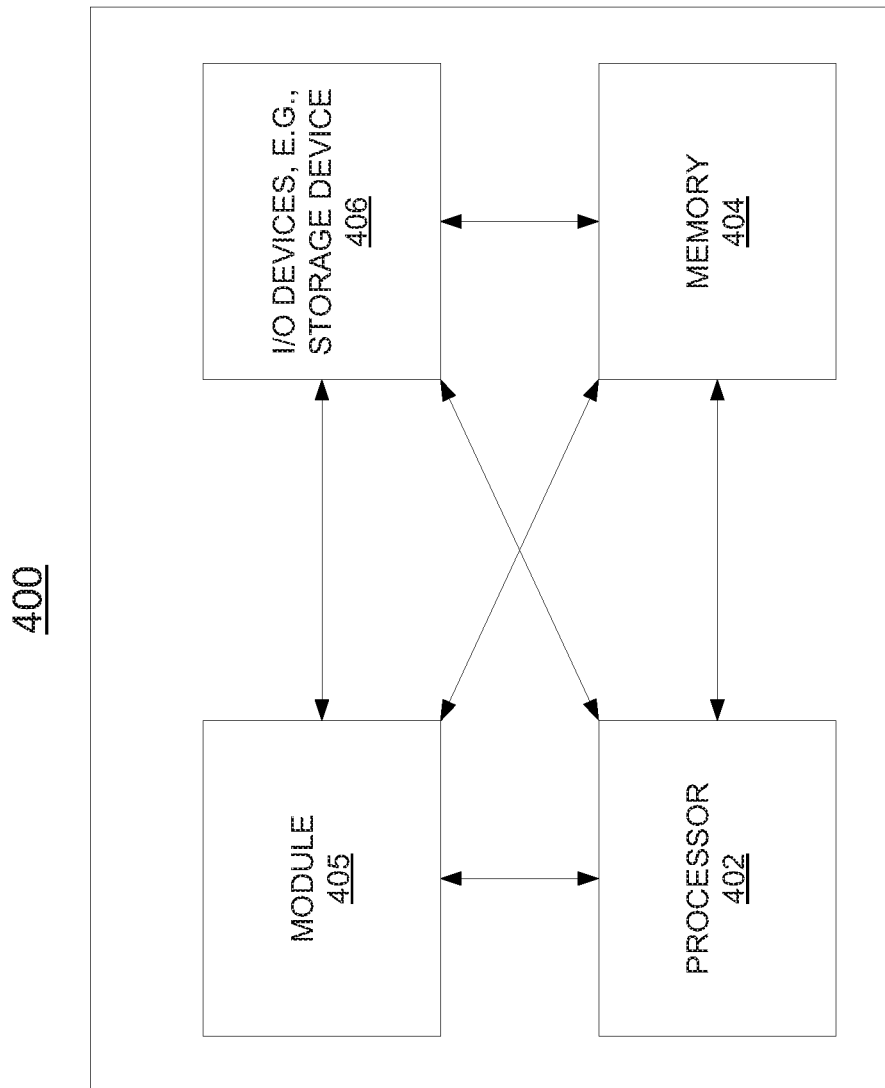
FIG. 4 illustrates a high level block diagram of a computing device specifically programmed to perform the steps, functions, blocks and/or operations described herein.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for mapping viewport information to a plurality of blocks of a frame of a panoramic video in accordance with a cube map projection of the frame and encoding the plurality of blocks into a projected frame or for obtaining from a server a projected frame comprising a plurality of blocks of a frame of a panoramic video that are associated with viewport information in accordance with a cube map projection of the frame.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 is illustrated, it should be noted that any number of servers may be deployed, and which may operate in a distributed and/or coordinated manner as a processing system to perform operations in connection with the present disclosure.

In one example, AS 104 may comprise a centralized network-based server for panoramic video streaming, e.g., 360-degree video streaming. In one example, AS 104 may comprise a physical storage device (e.g., a database server), to store 360-degree panoramic videos and/or non-360-degree panoramic videos. AS 104 may also transmit panoramic videos to requesting devices in accordance with the present disclosure. For ease of illustration, various additional elements of network 102 are omitted from FIG. 1.

Figure 3:
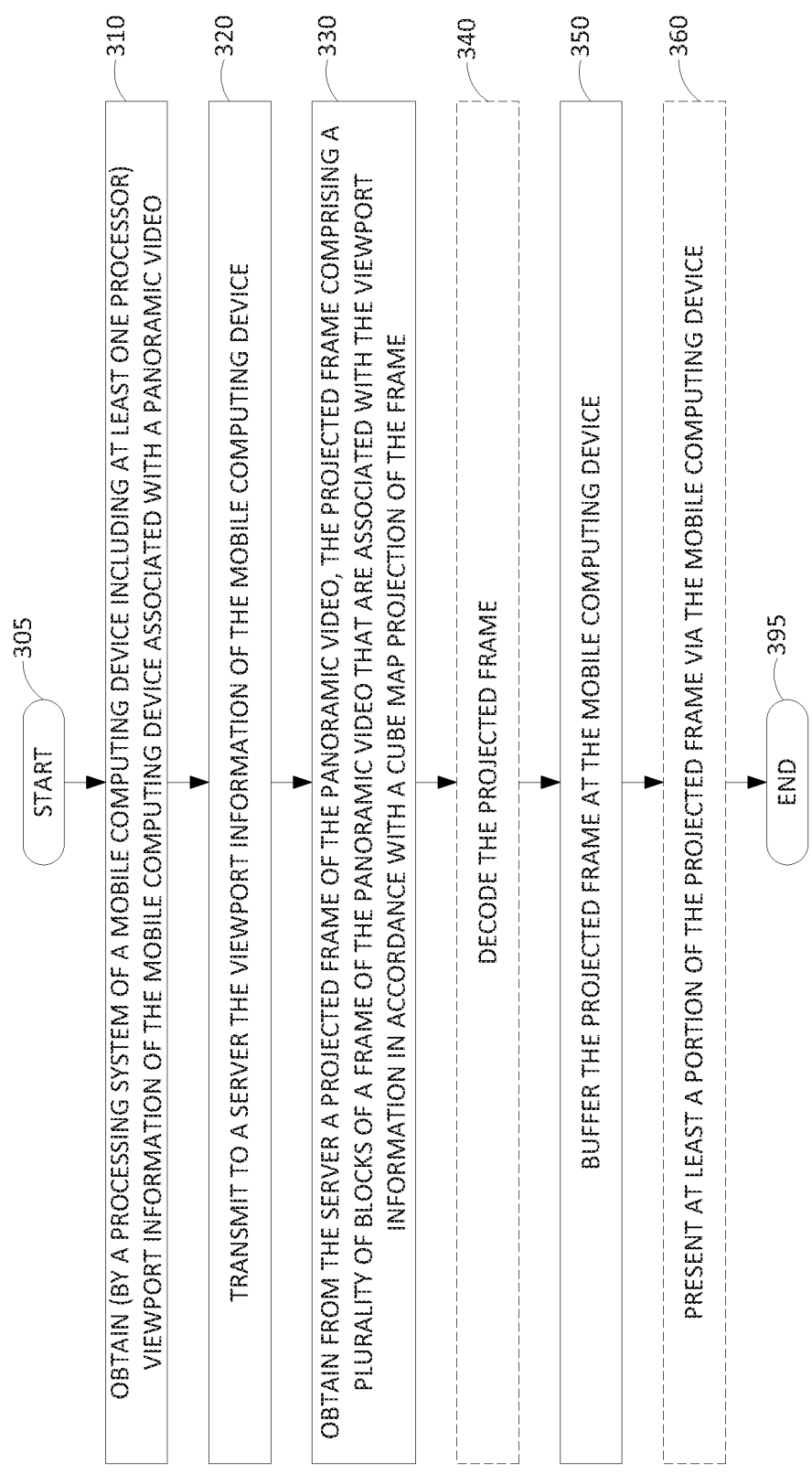
FIG. 3 illustrates a flowchart of an example method for obtaining from a server a projected frame comprising a plurality of blocks of a frame of a panoramic video that are associated with viewport information in accordance with a cube map projection of the frame.

In one example, access network 122 may include an edge server 108, which may comprise a computing system or server, such as computing system 400 depicted in FIG. 4, and may be configured to provide one or more operations or functions for mapping viewport information to a plurality of blocks of a frame of a panoramic video in accordance with a cube map projection of the frame and encoding the plurality of blocks into a projected frame, as described herein. For instance, an example method 300 for mapping viewport information to a plurality of blocks of a frame of a panoramic video in accordance with a cube map projection of the frame and encoding the plurality of blocks into a projected frame is illustrated in FIG. 3 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 106. Similarly, access network 122 may be in communication with one or more devices, e.g., device 132. Access networks 120 and 122 may transmit and receive communications between server 106, device 132, application server (AS) 104, other components of network 102, devices reachable via the Internet in general, and so forth. In one example, device 132 may comprise a mobile device, a cellular smart phone, a wearable computing device (e.g., smart glasses, a virtual reality (VR) headset, or the like), a laptop computer, a tablet computer, or the like (broadly a "mobile computing device"). In one example, device 132 may comprise a computing system or device, such as computing system 400 depicted in FIG. 4, and may be configured to provide one or more operations or functions for obtaining from a server a projected frame comprising a plurality of blocks of a frame of a panoramic video that are associated with viewport information in accordance with a cube map projection of the frame, as described herein.

In one example, server 106 may comprise a network-based server for panoramic video streaming. In this regard, server 106 may comprise the same or similar components as those of AS 104 and may provide the same or similar functions. Thus, any examples described herein with respect to AS 104 may similarly apply to server 106, and vice versa. In particular, server 106 may be a component of a panoramic video streaming system operated by an entity that is not a telecommunications network operator. For instance, a provider of a panoramic video streaming system may operate server 106 and may also operate edge sever 108 in accordance with an arrangement with a telecommunication service provider offering edge computing resources to third-parties. However, in another example, a telecommunication network service provider may operate network 102 and access network 122, and may also provide a panoramic video streaming system via AS 104 and edge server 108. For instance, in such an example, the panoramic video streaming system may comprise an additional service that may be offered to subscribers, e.g., in addition to network access services, telephony services, traditional television services, and so forth. In one example, a panoramic video streaming system including edge server 108 may comprise a content distribution network (CDN). Thus, in one example, one or more intermediate nodes may be present in a CDN between AS 104 and/or server 106 and edge server 108.

In an illustrative example, a panoramic video streaming system may be provided via AS 104 and edge server 108. In one example, user 192 may engage an application on device 132 (e.g., a "mobile computing device") to establish one or more sessions with the panoramic video streaming system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between device 132 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, device 132 may communicate with access network 122, network 102, the Internet in general, etc., via a WLAN that interfaces with access network 122.

In the example of FIG. 1, device 132 of user 192 may establish a session with edge server 108 for obtaining a panoramic video, which may be obtained as a sequence of frames and/or as chunks comprising a sequence or group of frames. For illustrative purposes, the panoramic video may comprise a 360-degree panoramic video. In this regard, an example frame 170 is illustrated in FIG. 1. In the illustrative example, the frame 170 may comprise a 360-degree (in azimuth and elevation) panorama. In one example, the edge server 108 may store a copy of the panoramic video (e.g., for a recorded video program). In another example, the edge server 108 may obtain the panoramic video (e.g., the frames thereof) from a centralized server for distributing panoramic videos. For instance, AS 104 or server 106 may comprise such a centralized server.

Device 132 may comprise a wearable device which may include sensors for determining yaw, pitch, and roll parameters (e.g., along x, y, and z axes as illustrated in FIG. 1). For experiencing a 360-degree video, the device 132 may translate the x, y, and z parameters into a viewport 150. To illustrate, the viewport 150 may comprise a projection of the field-of-view (FoV) on the surface of a sphere 160 in the direction of a vector comprising the detected yaw, pitch, and roll (x, y, z). However, it should be noted that in accordance with the present disclosure the frame 170 may comprise visual information corresponding to and/or arranged in a format of a cube map projection 165. For instance, the cube map projection 165 may arrange visual information of 360 degrees in azimuth and 360 degrees in elevation (which may also be conceptualized as 180 degrees in elevation over 360 degrees in azimuth) into six faces of a cube, e.g., faces 0-5. To illustrate, the entire 360-degree panorama of frame 170 may be represented by visual information projected to the interior of faces 0-5 of the cube map projection 165, where the user/camera perspective is in the middle of the six faces.

For illustrative purposes, the frame 170 is illustrated in FIG. 1 in rectangular format, with the visual information corresponding to the faces 0-5 noted as labeled. For instance, the frame 170 generally depicts a scene with mountains, trees, the sky and clouds, the sun, a river, etc. For example, frame 1 may comprise a "front" view, frame 0 may be to the "left," frame 2 may be to the "right," frame 3 may be "overhead," frame 4 may be "behind," and frame 5 may be "below." It should be noted that the example layout of the frame 170 in the rectangular form is just one example layout and that in other, further, and different examples, the spatial relationship between the different faces in frame 170 for storage, transmission via one or more networks, etc. may be different than that which is shown in FIG. 1.

In accordance with the present disclosure, the frame 170 (and/or the faces 0-5 thereof according to the cube map projection 165) may be segregated into a plurality of blocks. For instance, for a 16K frame, each face may comprise 100 blocks (10 blocks×10 blocks) where each block may be 533×400 pixels. As noted above, for a viewport (such as viewport 150) having a FoV of 100 degrees×90 degrees, at most 142 blocks may overlap with the viewport. In FIG. 1, an example of the overlap of viewport 150 with frame 170 is illustrated. Note that the viewport 150 overlap with frame 170 may correspond to when the user 192 looks at the equator in a particular azimuthal direction. For instance, the viewport 150 may include most/all of face 1 and smaller portions of faces 0 and 2. For example, the viewport may include 100 blocks of face 1 (e.g., all of face 1) and 20 blocks from each of faces 0 and 2. The viewport overlap may vary for other directions.

As an alternative or in addition to projecting the field-of-view (FoV) on the surface of a sphere 160 in the direction of a vector comprising the detected yaw, pitch, and roll (x, y, z), the FoV may be mapped to portions of the frame 170 in accordance with the cube map projection 165. For example, as described above a "visibility map" may contain mappings of orientation (e.g., expressed as latitude/longitude) to the set of blocks overlapping with the corresponding viewport 150. For instance, in one example, the visibility map may have 181×361 entries that enumerate all possible orientations (latitude in [−90 degrees, 90 degrees], longitude in [−180 degrees, 180 degrees]) at the granularity of 1 degree, with each entry containing up to 142 block IDs. In another example, the orientation of viewport 150 may be expressed in different terms, such as yaw/pitch, yaw/pitch/roll (x, y, z), etc., which may have a similar visibility map to associate viewports with block IDs.

FIG. 1 further illustrates a projected frame 180, which is comprised of the blocks of frame 170 that overlap with the viewport 150 (and in one example, additional blocks from regions of the frame 170 adjacent to the viewport 150 and/or near to the viewport 150). For example, the shaded blocks 175 may correspond to blocks of the frame 170 that are within/overlap with the viewport 150, while the white/non-shaded blocks 176 may be additional blocks of the frame 170 from adjacent and/or near to the viewport 150. In one example, the shaded blocks 175 may be determined to be within/overlap with the viewport 150 according to a visibility map, e.g., as mentioned above. The additional (white) blocks 176 may be selected based upon one or more criteria (such as a viewport trajectory), and may be used to fill-out the projected frame 180 into an 8K frame. For instance, as shown in FIG. 1, the projected frame 180 is 15 blocks×10 blocks. In one example, this may provide an 8K resolution for the projected frame 180. It should be noted that in one example, each block of the frame 170 is 533×400 pixels. This number of pixels per block corresponds to a 16K resolution of the entire 360-degree panoramic frame 170). In addition, each of the blocks 175 and/or 176 may have a corresponding block ID, and the remainder of the blocks of the entire frame 170 may similarly be assigned/associated with respective block IDs.

In one example, device 132 of user 192 may establish a session with edge server 108 for obtaining a panoramic video that may be stored by edge server 108 and/or which may be obtained by edge server 108 from a centralized platform, such as AS 104 and/or server 106. In accordance with the present disclosure, the device 132 may provide viewport information to edge server 108 in advance of a playback deadline for each frame of the panoramic video.

For example, the submission of the viewport information may comprise a request to the edge server 108 to provide a transcoded, or projected frame (e.g., projected frame 180) from a source frame (e.g., frame 170). To illustrate, for frame 170 of the panoramic video, the edge server 108 may transcode the frame 170 into a projected frame 180 in accordance with a predicted viewport (e.g., viewport 150). For instance, the viewport 150 may be predicted for a time when it is anticipated that the projected frame 180 will be played-out (the "playback time" associated with frame 170).

In one example, the predicted viewport (e.g., viewport 150) is calculated by the edge server 108. To illustrate, the edge server 108 may obtain viewport traces from device 132. For instance, device 132 may periodically send actual measured viewport information (e.g., recent viewport information) to edge server 108, such as yaw, pitch, and roll measurements, and so forth. Edge server 108 may then use the recent viewport information to calculate the predicted viewport for the anticipated playback time associated with frame 170. In one example, the recent viewport information (which may be referred to as a "viewport trace"), may be processed via a trained machine learning algorithm (MLA), e.g., a MLM, to output a predicted viewport. For instance, the recent viewport information may indicate a trajectory of the viewport in a general direction. It may be expected that the viewport movement is likely to continue in the same general direction as indicated by the trajectory, which may be quantified by the output of the MLM—the predicted viewport.

In one example, the predicted viewport (e.g., viewport 150) may be further based upon heatmap and/or saliency map-based region of interest (RoI) identification. For instance, AS 104 may provide heatmap information, e.g., identification of a region or regions of the frame 170 that are most popular among prior users. Similarly, AS 104 may provide saliency map information, e.g., identification of a region or regions of the frame that are determined to be the most "salient" according to an image saliency detection algorithm (e.g., as applied to individual frames or a plurality of frames). In one example, edge server 108 (and other edge servers, if present, in the panoramic video streaming system) may utilize viewport traces to perform viewport-adaptive transcoding, and may also provide the viewport traces to AS 104 for aggregation and developing heatmaps for frames of the panoramic video (including frame 170). The saliency map information and heatmap information may be stored along with the panoramic video. For example, the panoramic video may comprise recorded and stored content. However, in another example, the panoramic video may be a "live" stream, such as where video capture devices may feed AS 104 or server 106 with panoramic video frames, and where AS 104 or server 106 may disseminate the frames in real-time or near-real-time (e.g., as fast as AS 104 and/or server 106 may process the frames, including any formatting/encoding, tiling, etc.). In any case, the saliency map and/or heatmap-identified RoIs can then be used in conjunction with a user's viewport trajectory to further increase the accuracy of future viewport prediction. In one example, the saliency map and/or heatmap information may comprise additional inputs into a MLM for viewport prediction. In another example, a predicted viewport may be generated via the MLM and combined with the saliency map and/or heatmap information to modify the predicted viewport, e.g., to move a center of the predicted viewport toward a region or regions of the frame that are identified in the saliency map and/or heatmap information.

In one example, after obtaining the predicted viewport 150, edge server 108 may also determine the set of blocks of frame 170 overlapping with the predicted viewport 150, e.g., in accordance with a visibility map that associates viewport and/or viewport orientation to the overlapping blocks (e.g., the shaded blocks 175). In particular, the edge server 108 may assemble projected frame 180 in accordance with the predicted viewport 150. As noted above, in one example, the FoV/predicted viewport 150 at most may include 142 blocks. To fill-out the projected frame 180 (e.g., to provide 8K), the edge server 108 may also identify additional blocks of the frame 170 that may be added to the projected frame 180. For instance, the additional (white) blocks 176 may be selected based upon one or more criteria (such as a viewport trajectory). For example, the trajectory may indicate that the viewport 150 (and hence the head and eyes of user 192) are moving toward the left. In this case, the edge server 108 may enlarge the FoV by 1 degree toward the left direction and/or add additional blocks into the projected frame 180 that are toward the left of the predicted viewport 150. In one example, these blocks (e.g., blocks 176) may be ordered in the projected frame 180 based on their distances to the central point of the predicted viewport 150. If there is still more space, the viewport 150 may be progressively enlarged in the up, down and/or right directions, e.g., by 1 degree, may be enlarged in the left direction by 2 degrees, may be enlarged in the up, down, and/or right directions by 2 degrees, and so on as space allows.

In still another example, device 132 may generate the viewport information for the playback deadline associated with frame 170 and may provide the viewport information to edge server 108 for block selection. For instance, the "viewport information" provided by device 132 to edge server 108 may comprise a predicted yaw, pitch, and roll at the playback deadline, or may comprise the predicted viewport 150 itself. The prediction by device 132 may be similar to the example described above where the prediction of the viewport 150 is made by edge server 108 based upon viewport trace(s). For instance, a prediction of viewport 150 (or the predicted viewport information, such as yaw, pitch, and roll parameters) may be based upon actual measured viewport information (e.g., recent viewport information). For example, device 132 may use the same or a similar trained MLA, e.g., a MLM, to output the viewport information (e.g., predicted viewport information comprising a predicted yaw, pitch, and roll, and/or the predicted viewport 150 itself).

In one example, the device 132 may additionally determine the set of blocks of frame 170 that overlaps with the predicted viewport 150, e.g., in accordance with a visibility map that associates viewport and/or viewport orientation to the overlapping blocks (e.g., the shaded blocks 175). In such, an example, the "viewport information" provided by device 132 to the edge server 108 may comprise the block IDs of the blocks that are determined. In one example, the device 132 may also indicate additional block IDs, such as blocks 176 as described above. For instance, device 132 may enlarge the FoV and/or select additional blocks outside of the FoV or predicted viewport 150, e.g., based upon a viewport trajectory. In another example, the edge server 108 may obtain the viewport information (e.g., the block IDs) from device 132, and may select additional blocks, e.g., in accordance with a viewport trajectory, by selecting additional blocks uniformly around the different edges of the viewport 150, etc. In any case, the edge server 108 may retrieve the blocks of frame 170 that are to be included in the projected frame 180 based upon the block IDs (e.g., of blocks 175 and/or of blocks 175 and 176).

After obtaining the blocks to be included in the projected frame 180, edge server 108 may encode the projected frame 180. For instance, edge server 108 may encode the projected frame 180 in accordance with MPEG-4 (Moving Picture Experts Group-4), H.264/AVC (Advanced Video Coding), H.265/HEVC (High Efficiency Video Coding), or the like (e.g., within each frame). In one example, the blocks may be rearranged to provide adjacency to blocks that are visually similar (e.g., similar colors, brightness, texture, etc.), which may provide improved encoding efficiency. For example, blocks containing sky and cloud may be placed in one area, the blocks containing the forest may be placed in another area, and so forth. In one example, the projected frame 180 may also be encoded into a stream or sequence of multiple projected frames. For instance, a group of projected frames, or a "chunk," may be interframe encoded, e.g., in accordance with interframe aspects of H.264/AVC, H.265/HEVC, or the like. In one example, the projected frame 180 may include visual information of the blocks 175 and blocks 176, as well as block IDs which indicate the positions of the respective blocks with a visual space associated with the panoramic video (e.g., according to the cube map projection 165).

Continuing with the present example in reference to FIG. 1, the edge server 108 may transmit the projected frame 180 containing the applicable encoding to device 132. Device 132 may buffer and/or store the projected frame 180, and may render the projected frame 180 for display following the presentation/display of the previous projected frame in the sequence of panoramic video. In one example, the device 132 may apply an interframe decoding where the projected frame 180 may be transmitted as part of a group of frames, or a chunk. In one example, the device 132 may also apply an intraframe decoding to obtain the original visual information of the blocks 175 (and in one example blocks 176 as well). In addition, if the blocks have been spatially rearranged in projected frame 180, since the blocks have corresponding block IDs, the blocks may be rearranged and presented in the spatially correct order at the device 132 at playback time. In particular, the device 132 may use a "visibility map" or a block ID-to-cube map position mapping to associate block IDs with the correct positions on the respective faces 0-5 according to cube map projection 165. In addition, as the user 192 continues to consume the panoramic video, the device 132 may continue to send viewport information to edge server 108, and edge server 108 may continue to transcode frames of the panoramic video into projected frames in accordance with the viewport information and provide the projected frames to device 132.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, content distribution network (CDN) infrastructure, and the like. For example, portions of network 102, access networks 120 and 122, and/or Internet may comprise a content distribution network (CDN) having ingest servers, edge servers, and the like for packet-based streaming of video, audio, or other content. Similarly, although only two access networks 120 and 122 are shown, in other examples, access networks 120 and/or 122 may each comprise a plurality of different access networks that may interface with network 102 independently or in a chained manner. In addition, as described above, the functions of AS 104 may be similarly provided by server 106, or may be provided by AS 104 in conjunction with server 106. For instance, AS 104 and server 106 may be configured in a load balancing arrangement, or may be configured to provide for backups or redundancies with respect to each other, and so forth.

In still another example, instead of panoramic video streaming from servers storing such panoramic videos, the streaming may be device-to-device. For instance, edge server 108 and AS 104 and/or server 106 may provide similar functions in support of streaming of panoramic video from another mobile computing device (or other user endpoint device, such as a desktop computer, a smart television, etc.) that is capable of capturing panoramic video (e.g., 360-degree video or non-360-degree panoramic video) to device 132. For example, another person may travel to an interesting destination and may wish to share a panoramic video stream captured from the destination with user 192, e.g., in real-time or near-real-time. In such an example, the panoramic video stream may be generated by the other endpoint device and forwarded to edge server 108, where edge server 108 may transcode frames and forward the frames to device 132 in accordance with the present disclosure (e.g., performing the operations of the example method 200 of FIG. 2, and/or as described elsewhere herein). In still another example, operations described above in connection with edge server 108 may alternatively or additionally be performed by AS 104 and/or server 106. For instance, a panoramic video streaming service may be provided via one or more network-based servers without "edge" infrastructure components and/or in a non-CDN arrangement, and so forth.

In one example, an actual viewport at playback time may be different from the predicted viewport 150. In such case, there may be blank information presented in regions of the actual viewport for which no visual information was obtained in the projected frame 180. However, in another example, the present disclosure may also send lower resolution versions of the entire panoramic frame 170 which may be used in the event that the actual and predicted viewports differ. For instance, a copy of the panoramic video having a lower resolution version of each frame may be stored at AS 104, server 106, and/or edge server 108 for this purpose. Alternatively, or in addition, AS 104, server 106, and/or edge server 108 may also transcode the full panoramic frame 170 (e.g., at 16K) into a lower resolution version containing all blocks (or all or at least a portion of those blocks not included in the projected frame as described above), such as a 4K version, a 2K version, etc. The lower resolution version may then be transmitted to the device 132 in conjunction with the projected frame 180.

In addition, it should again be noted that a spherical or nearly complete spherical "360-degree video" is just one example of a panoramic video in accordance with the present disclosure. For instance, in another example, a panoramic video may comprise a cylindrical panorama covering 360 degrees in azimuth (horizontal) and less than 360 degrees in elevation/vertically (e.g., 90 degrees of elevation in any given azimuthal direction). In another example, the panoramic video may comprise less than 360 degrees in both azimuth and elevation, such as 270 degrees (cylindrically) in azimuth, 230 degrees in azimuth, etc., and 90 degrees in elevation, 120 degrees, in elevation, etc. Thus, these and other modifications are all contemplated within the scope of the present disclosure.

Figure 2:
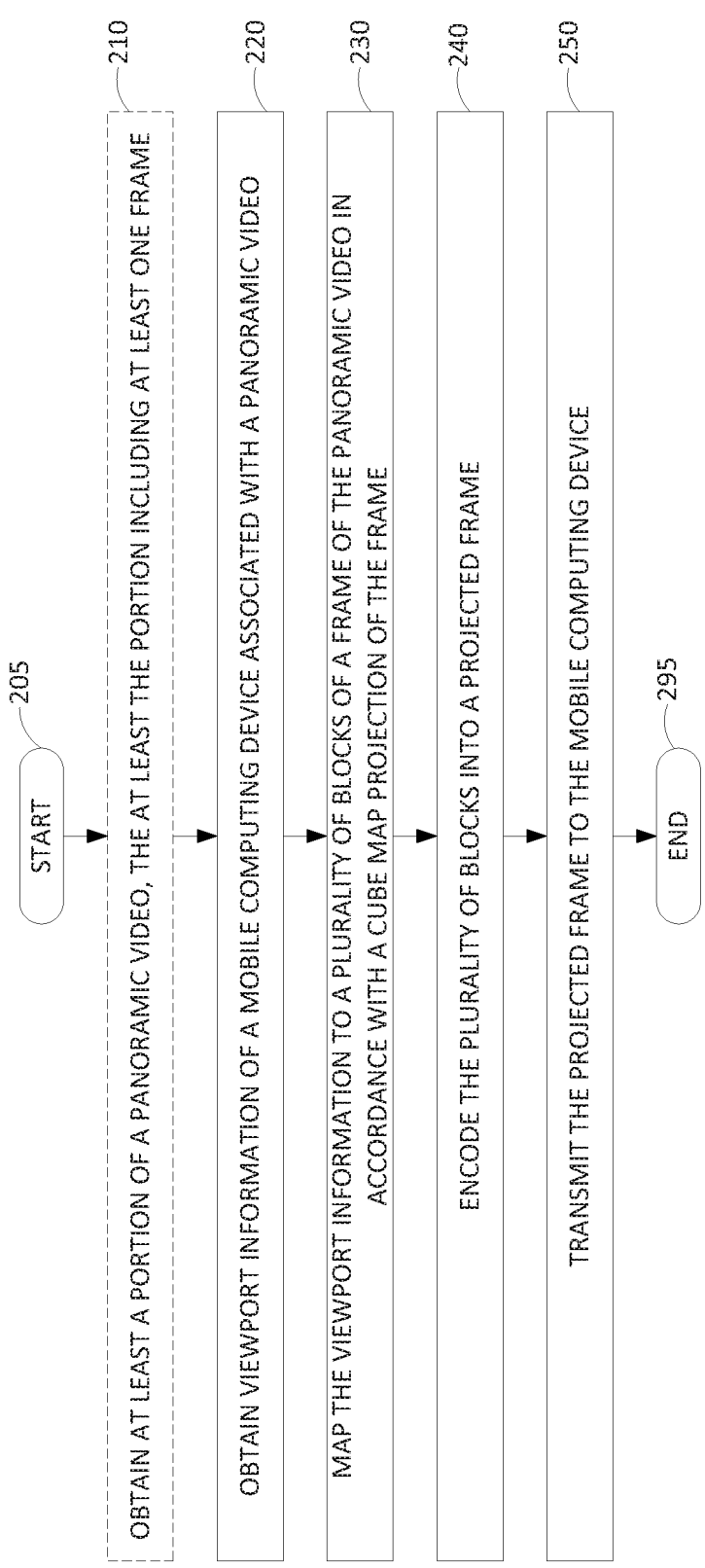
FIG. 2 illustrates a flowchart of an example method for mapping viewport information to a plurality of blocks of a frame of a panoramic video in accordance with a cube map projection of the frame and encoding the plurality of blocks into a projected frame.

FIG. 2 illustrates a flowchart of an example method 200 for mapping viewport information to a plurality of blocks of a frame of a panoramic video in accordance with a cube map projection of the frame and encoding the plurality of blocks into a projected frame, in accordance with the present disclosure. In one example, the method 200 is performed by a component of the system 100 of FIG. 1, such as by edge server 108, and/or any one or more components thereof (e.g., a processor, or processors, performing operations stored in and loaded from a memory), or by edge server 108 in conjunction with one or more other devices, such as device 132, AS 104 or server 106, and so on. In one example, the steps, functions, or operations of method 200 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processing system. The method 200 begins in step 205 and may proceed to optional step 210 or to step 220.

At optional step 210, the processing system (e.g., of a network-based server, such as an edge server) may obtain at least a portion of a panoramic video, the at least the portion including at least one frame. For instance, the portion of the panoramic video may be obtained from a centralized server for distributing panoramic videos. In one example, the centralized server and the edge server may comprise components of a content distribution network (CDN). In another example, the panoramic video may be obtained from a video capture device and/or via one or more intermediate devices from the video capture device, e.g., for a "live" stream. In one example, the panoramic video may comprise 360-degree video or non-360-degree panoramic video (e.g., less than a full 360-degrees in azimuth, elevation, or both, and/or where a field of view/viewport of a client device/mobile computing device is less than the entire frame). In addition, "video" can be recorded imagery, animation/computer generated imagery, a combination thereof, and so forth. In one example, optional step 210 may include decoding the portion of the panoramic video (e.g., when the version of the panoramic video obtained by the processing system at optional step 210 is encoded, such as in accordance with H.264/AVC, H.265/HEVC, MPEG-4, etc.). In one example, the at least one frame (and/or any other frames of the panoramic video) may be an ultra-high-definition (UHD) frame. For instance, the frames of the panoramic video may be encoded at 16K resolution (e.g., for a full 360-degree panoramic video) and/or at a resolution of 3600 pixels/deg$^2$, and so forth.

At step 220, the processing system obtains viewport information of a mobile computing device associated with the panoramic video. For instance, the mobile computing device may send viewport traces comprising a sequence of viewports for a sequence of frames of the panoramic video to the processing system (e.g., of the edge server) periodically or according to a different schedule, opportunistically (e.g., when network bandwidth fluctuates, viewport traces may be sent when network bandwidth is relatively higher), in response to a request from the processing system, etc. The processing system at step 220 may calculate the predicted viewport in accordance with a plurality of previous viewports (e.g., viewport trace(s)) of the mobile computing device for a plurality prior frames of the panoramic video. In one example, the calculation of the predicted viewport may be via trained machine learning algorithm (MLA), e.g., a "machine learning model" (MLM), or other predictive algorithm.

In one example, the predicted viewport is calculated further based upon at least one of historical viewport information regarding previous viewports with respect to the frame of other mobile computing devices that have experienced the panoramic video or salient portions of the frame as determined in accordance with an image saliency detection algorithm. In one example, the plurality of previous viewports may correspond to a "trajectory" of the viewport.

In one example, step 220 may include, in addition to calculating a predicted viewport, calculating a trajectory of the viewport, e.g., a vector indicating a magnitude (e.g., speed of movement) and direction. For example, as noted above, the trajectory may be determined in accordance with a plurality of previous viewports of the mobile computing device for a plurality prior frames of the panoramic video (e.g., via the same or a different MLM as the MLM for calculating the predicted viewport) or via a similar predictive technique. Similarly, the trajectory may be further determined based upon at least one of: (1) historical viewport information regarding previous viewports with respect to the frame of other mobile computing devices that have experienced the panoramic video stream or (2) salient portions of the frame as determined in accordance with an image saliency detection algorithm. For instance, viewport trace(s) of the mobile computing device may tend to indicate that the viewport (and correspondingly, a viewer's head and/or eyes) is moving in a particular direction with a particular speed. However, saliency map and/or heatmap information available to the processing system may indicate that there is a particular popular and/or salient portion of the frame. For instance, there may be a bright explosion visible in a particular region of the frame, an object may appear to be headed right towards the camera from a particular direction that has historically tended to garner most users' attentions, and so forth. Thus, the processing system may determine that the trajectory of the viewport may tend to track towards this region.

It should be noted that in another example, the mobile computing device may calculate its own predicted viewport, and report the predicted viewport to the processing system (e.g., to the edge server). In other words, in one example, the "viewport information" obtained at step 220 may comprise the predicted viewport. In one example, the mobile computing device may provide a predicted viewport based upon recent viewports, where the processing system then takes the predicted viewport (as calculated by the client device) and integrates the mobile computing device's prediction with historical viewport information from other devices and/or image saliency information to come up with a final predicted viewport that may be used for transcoding in accordance with the following steps. In other words, the processing system may take into consideration the mobile computing device's prediction, but may modify it, if warranted, based upon additional knowledge of historical viewership and what is "salient" in the frame and/or one or more upcoming frames. Similarly, in one example, the mobile computing device may calculate its own viewport trajectory using a same or a similar process as described above. Thus, in one example, the "viewport information" that is obtained at step 220 may further comprise the viewport trajectory that may be calculated by the mobile computing device and provided to the processing system.

As noted above, in one example, a client device/mobile computing device may also identify blocks of a frame that overlap with a predicted viewport according to a "visibility map," e.g., a viewport-to-block ID mapping. In such an example, the mobile computing device may submit block IDs that overlap with the predicted viewport to the processing system, which may be received at step 220. In other words, the "viewport information" obtained at step 220 may comprise the block IDs of the blocks that are identified. In one example, the mobile computing device may also select additional blocks that may be outside of the predicted viewport, such as additional blocks outside of the predicted viewport in a direction of a viewport trajectory, additional blocks selected uniformly from around two or more edges of the predicted viewport, etc. The number of additional blocks may be dependent upon a projected frame size to be utilized at steps 240 and 250 as well as the number of blocks of the frame that are determined to overlap and/or fall within the predicted viewport. For instance, if a projected frame size is 150 blocks and 142 blocks are determined to overlap with the predicted viewport, the mobile computing device may select an additional 8 blocks to include in the "viewport information."

At step 230, the processing system maps the predicted viewport information to a plurality of blocks of the frame of the panoramic video in accordance with a cube map projection of the frame. For instance, in one example, the "viewport information" may identify a predicted viewport orientation (e.g., a direction in which a center of the predicted viewport points). In addition, in one example, a "visibility map" may associate viewport orientations to respective sets of blocks of the frame (e.g., identified by block IDs). Thus, in one example, the processing system may map the predicted viewport direction to the corresponding set of blocks via such a visibility map. In other words, the plurality of blocks of the frame may be identified in accordance with the predicted viewport and a viewport-to-block identification mapping. It should be noted that in such an example, the processing system may also be aware of and/or receive knowledge of a FoV of the viewport, such that the processing system is not only aware of the direction of the viewport, but also the bounds of the viewport. For instance, in one example, the FoV of the mobile computing device may be 100 degrees×90 degrees or less.

As noted above, the blocks of the frame may each have a corresponding position on a respective face of a cube according to the cube map projection. For instance, the cube map projection of the frame may comprise six faces, where each of the six faces is divided into an equal set of blocks (e.g., 10×10, or 100 blocks per face). In one example, the processing system may also identify blocks of the frame that are outside of the predicted viewport that may be included in a projected frame at the following step 240. For instance, as mentioned above, a viewport trajectory may be used to select additional blocks that are outside of the predicted viewport, but in a direction of a viewport trajectory. As also noted above, the processing system may calculate the viewport trajectory, or may receive the viewport trajectory from the mobile computing device in the viewport information obtained at step 220. In one example, step 230 may include retrieving the respective blocks associated with the block IDs that are determined by the processing system at step 230 or that are identified in the "viewport information" obtained at step 220 from the mobile computing device.

At step 240, the processing system encodes the plurality of blocks into a projected frame. In one example, the plurality of blocks is arranged to provide an 8K resolution of the projected frame (e.g., 8K pixels×4K pixels). In one example, the projected frame may include 150 blocks, each block having 533 pixels×400 pixels. In one example, the projected frame has the same resolution (per given area) as the original frame, e.g., 3,600 pixels/deg$^2$. In one example, the processing system may encode the projected frame in accordance with MPEG-4 (Moving Picture Experts Group-4), H.264/AVC (Advanced Video Coding), H.265/HEVC (High Efficiency Video Coding), or the like (e.g., intraframe, or within each frame). In one example, the blocks may be rearranged to provide adjacency to blocks that are visually similar. In one example, the projected frame may also be encoded into a stream or sequence of multiple projected frames. For instance, a group of projected frames, or a "chunk," may be interframe encoded, e.g., in accordance with interframe aspects of H.264/AVC, H.265/HEVC, or the like. In one example, the projected frame may include visual information of the blocks as well as block IDs which indicate the positions of the respective blocks with a visual space associated with the panoramic video (e.g., according to the cube map projection).

At step 250, the processing system transmits the projected frame to the mobile computing device. In one example, the projected frame may be transmitted as part of a chunk, or group of frames. In addition, in one example, the chunk or group of frames may be interframe encoded. As noted above, the projected frame may include visual information of the plurality of blocks as well as block ID. Accordingly, upon receiving the projected frame, the mobile computing device may present at least a portion of the projected frame in accordance with the identifications of the plurality of blocks, e.g., via a visibility map and/or a block ID-to-cube map position mapping. In one example, the obtaining of step 220 and the transmitting of step 250 may be via a mobile wireless network link, e.g., a cellular or IEEE 802.11 communication modality.

Following step 295, the method 200 proceeds to step 295. At step 295, the method 200 ends.

It should be noted that the method 200 may be expanded to include additional steps, or may be modified to replace steps with different steps, to combine steps, to omit steps, to perform steps in a different order, and so forth. For example, the processor may repeat one or more steps of the method 200, such as steps 210-250, steps 220-250, etc. For instance, various steps of the method 200 may be repeated for additional frames of the panoramic video. In another example, the method 200 may include storing the frame (and additional frames and/or chunks of the panoramic video), e.g., at the edge server. The storing may be prior to performing the operations of steps 220-250, or may be after step 250. For instance, the panoramic video, or at least a portion thereof, may be stored for other users who may be interested in experiencing the panoramic video via the respective mobile computing devices that may be served by the processing system. In still another example, the method 200 may include performing the steps 220-250 for a plurality of different users and/or mobile computing devices. For instance, the panoramic video may be a live or near-live stream that may be experienced simultaneously by multiple users via the processing system (e.g., of an edge server) and/or via other edge servers. Since each of these users may have a unique viewport, the processing system may perform separate viewport predictions and may apply unique viewport-adaptive transcodings to generate different projected frames for each mobile computing device. Thus, these and other modifications are all contemplated within the scope of the present disclosure.

FIG. 3 illustrates a flowchart of an example method 300 for obtaining from a server a projected frame comprising a plurality of blocks of a frame of a panoramic video that are associated with viewport information in accordance with a cube map projection of the frame, in accordance with the present disclosure. In one example, the method 300 is performed by a component of the system 100 of FIG. 1, such as by device 132, and/or any one or more components thereof (e.g., a processor, or processors, performing operations stored in and loaded from a memory), or by device 132 in conjunction with one or more other devices, such as edge server 108, AS 104 or server 106, and so on. In one example, the steps, functions, or operations of method 300 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system (e.g., of a mobile computing device) may obtain viewport information of the first mobile computing device associated with a panoramic video. In one example, step 310 may comprise determining a predicted viewport of the mobile computing device in connection with an anticipated playback time for an upcoming frame. In one example, the processing system may apply a trained MLA, or a MLM, or other predictive technique to a plurality of prior viewports (e.g., a viewport trace) to predict a future viewport. In one example, the viewport prediction may be made in accordance with measurements obtained via sensors of the first mobile computing device (e.g., to provide yaw, pitch, and roll parameters) and a FoV of the mobile computing device. In another example, the processing system may not determine a predicted viewport, but may instead collect information regarding a plurality of prior viewports (or information regarding the viewport for a plurality of frames which have been rendered and displayed). In one example, the information may include yaw, pitch, and roll parameters (e.g., the viewport orientations). In one example, the information may include the bounds of the viewport for the prior frames.

In one example, the processing system may map a predicted viewport orientation (and in one example the FoV/bounds of the viewport) to a set of block IDs. For instance, the processing system may apply a viewport-to-block ID mapping, e.g., a visibility map, to determine the block IDs within the predicted viewport. In one example, the processing system may also calculate a viewport trajectory, as described above, and may select block IDs of additional blocks that are outside of the predicted viewport, but which may be in a direction of the trajectory.

At step 320, the processing system transmits the viewport information of the mobile computing device to a server (e.g., an edge server or other server of a panoramic video streaming system). In one example, the viewport information may comprise a predicted viewport that is determined at step 310. In another example, the processing system may transmit information regarding a current or recent viewport (e.g., yaw, pitch, and roll measurements, and in some cases FoV size information, etc.). In one example, step 320 may comprise transmitting a viewport trace, e.g., information regarding a sequence of recent viewports. For instance, one or more prior viewports and/or the current viewport may be used by the server to calculate the predicted viewport of the first mobile computing device for a playback time associated with a chunk of the panoramic video. In still another example, as noted above, the processing system may map the predicted viewport to one or more block IDs at step 310. In such case the viewport information transmitted at step 320 may include the set of block IDs.

At step 330, the processing system obtains from the server a projected frame of the panoramic video, the projected frame comprising a plurality of blocks of a frame of the panoramic video that are associated with the viewport information in accordance with a cube map projection of the frame. For instance, the server may generate the projected frame based upon the viewport information, e.g., in accordance with the example method 200 and/or as described elsewhere herein. In one example, the projected frame may be intraframe encoded and/or interframe encoded. In the latter case, the projected frame may be obtained as part of a chunk or group of frames from the server. For instance, the projected frame may be intraframe and/or interframe encoded according to at least one of a H.264 encoding, a H.265 encoding, or the like. In one example, the transmitting of step 320 and the obtaining of step 330 may be via a mobile wireless network link, e.g., a cellular or IEEE 802.11 communication modality.

At optional step 340, the processing system may decode the projected frame. For instance, if the projected frame is obtained in an encoded format, the processing system may correspondingly decode the projected frame, e.g., in accordance with H.264 intraframe and/or interframe encoding, in accordance with H.265 intraframe and/or interframe encoding, etc.

At step 350, the processing system buffers the projected frame at the mobile computing device. For instance, the projected frame may have a playback time that has not arrived. Thus, the projected frame may be temporarily buffered, e.g., stored and/or held in memory until the playback time arrives. The processing system may similarly buffer other projected frames that await playback.

At optional step 360, the processing system may present at least a portion of the projected frame via the mobile computing device. In one example, optional step 360 may include first determining the viewport of the mobile computing device (e.g., a current viewport), identifying blocks that are within the viewport, and rendering any of the blocks that are available from the projected frame 180. In one example, the blocks within the actual viewport may be identified by block ID according to a viewport-to-block ID mapping, e.g., a visibility map. In one example, the rendering may include projecting the blocks in the appropriate visual locations according to the cube map projection. For instance, the processing system may utilize a mapping of block IDs to locations on respective faces of a cube according to the cube map projection. The block locations may then be processed by display components of the mobile computing device to project the visual information of the blocks in the correct locations such that the user-perceived experience is of a panoramic image (e.g., a spherical or cylindrical image).

Following step 350 or optional step 360, the method 300 proceeds to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300, such as steps 310-350, steps 310-360, etc. In another example, the method 300 may include determining a buffer occupancy of the processing system and/or determining a network bandwidth or throughput, and adjusting a size of the FoV (and/or adjusting the size of the projected frame). For example, if a drop in network bandwidth is detected, the processing system may request fewer blocks (e.g., for a narrower FoV) than the mobile computing device is capable of displaying. The processing system may maintain this reduced FoV for some time until the network bandwidth is recovered. In this way, the likelihood is increased of the mobile computing device and server being able to maintain the video stream without stalls. Thus, these and other modifications are all contemplated within the scope of the present disclosure.

In addition, although not expressly specified above, one or more steps of the method 200 or the method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1, or described in connection with the example of FIG. 2 and/or the method 300 of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for mapping viewport information to a plurality of blocks of a frame of a panoramic video in accordance with a cube map projection of the frame and encoding the plurality of blocks into a projected frame or for obtaining from a server a projected frame comprising a plurality of blocks of a frame of a panoramic video that are associated with viewport information in accordance with a cube map projection of the frame, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for mapping viewport information to a plurality of blocks of a frame of a panoramic video in accordance with a cube map projection of the frame and encoding the plurality of blocks into a projected frame or for obtaining from a server a projected frame comprising a plurality of blocks of a frame of a panoramic video that are associated with viewport information in accordance with a cube map projection of the frame (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for mapping viewport information to a plurality of blocks of a frame of a panoramic video in accordance with a cube map projection of the frame and encoding the plurality of blocks into a projected frame or for obtaining from a server a projected frame comprising a plurality of blocks of a frame of a panoramic video that are associated with viewport information in accordance with a cube map projection of the frame (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by a processing system including at least one processor deployed in a cellular network, viewport information of a mobile computing device associated with a panoramic video;
   mapping, by the processing system, the viewport information to a plurality of blocks of a frame of the panoramic video in accordance with a cube map projection of the frame, wherein the plurality of blocks comprises blocks that overlap with a predicted viewport of the mobile computing device in accordance with the viewport information;
   encoding, by the processing system, the plurality of blocks into a projected frame; and
   transmitting, by the processing system, the projected frame to the mobile computing device.

2. The method of claim 1, wherein the cube map projection of the frame comprises six faces, wherein each of the six faces is divided into an equal set of blocks.

3. The method of claim 1, wherein the viewport information comprises the predicted viewport of the mobile computing device.

4. The method of claim 3, wherein the mapping comprises:
   identifying the plurality of blocks of the frame in accordance with the predicted viewport and a viewport-to-block identification mapping.

5. The method of claim 1, wherein the viewport information comprises identifications of the plurality of blocks of the frame.

6. The method of claim 5, wherein the mobile computing device identifies the plurality of blocks of the frame in accordance with the predicted viewport of the mobile computing device and a viewport-to-block identification mapping.

7. The method of claim 1, wherein the mapping comprises:
   determining the predicted viewport of the mobile computing device from the viewport information; and
   identifying the plurality of blocks of the frame in accordance with the predicted viewport and a viewport-to-block identification mapping.

8. The method of claim 1, wherein the projected frame includes identifications of the plurality of blocks.

9. The method of claim 8, wherein the mobile computing device is to present at least a portion of the projected frame in accordance with the identifications of the plurality of blocks.

10. The method of claim 1, wherein the mapping includes:
determining a viewport trajectory of the mobile computing device, wherein the plurality of blocks further comprises blocks that are outside of the predicted viewport in a direction in accordance with the viewport trajectory.

11. The method of claim 1, wherein the viewport information comprises viewport trajectory information of the mobile computing device, wherein the plurality of blocks comprises blocks that overlap with the predicted viewport of the mobile computing device in accordance with the viewport information, and wherein the plurality of blocks further comprises blocks that are outside of the predicted viewport in a direction in accordance with the viewport trajectory.

12. The method of claim 1, wherein the frame is of a 16K resolution and the projected frame is of an 8K resolution, or wherein the frame is of an 8K resolution and the projected frame is of a 4K resolution.

13. The method of claim 1, wherein the projected frame is encoded according to at least one of:
a H.264 encoding; or
a H.265 encoding.

14. The method of claim 1, wherein the panoramic video comprises a 360-degree video.

15. A non-transitory computer-readable medium storing instructions which, when executed by a processing system including at least one processor deployed in a cellular network, cause the processing system to perform operations, the operations comprising:
obtaining viewport information of a mobile computing device associated with a panoramic video;
mapping the viewport information to a plurality of blocks of a frame of the panoramic video in accordance with a cube map projection of the frame, wherein the plurality of blocks comprises blocks that overlap with a predicted viewport of the mobile computing device in accordance with the viewport information;
encoding the plurality of blocks into a projected frame; and
transmitting the projected frame to the mobile computing device.

16. A method, comprising:
obtaining, by a processing system of a mobile computing device including at least one processor, viewport information of the mobile computing device associated with a panoramic video;
transmitting, by the processing system to a server deployed in a cellular network, the viewport information of the mobile computing device;
obtaining, by the processing system from the server, a projected frame of the panoramic video, the projected frame comprising a plurality of blocks of a frame of the panoramic video that are associated with the viewport information in accordance with a cube map projection of the frame, wherein the plurality of blocks comprises blocks that overlap with a predicted viewport of the mobile computing device in accordance with the viewport information; and
buffering, by the processing system, the projected frame at the mobile computing device.

17. The method of claim 16, further comprising:
presenting, by the processing system, at least a portion of the projected frame via the mobile computing device.

18. The method of claim 16, wherein the projected frame includes identifications of the plurality of blocks.

19. The method of claim 18, further comprising:
presenting, by the processing system, at least a portion of the projected frame via the mobile computing device, in accordance with the identifications of the plurality of blocks.

20. The non-transitory computer-readable medium of claim 15, wherein the cube map projection of the frame comprises six faces, wherein each of the six faces is divided into an equal set of blocks.

* * * * *